United States Patent
Werschnik et al.

(10) Patent No.: US 12,083,621 B2
(45) Date of Patent: Sep. 10, 2024

(54) APPARATUS AND METHOD FOR FOCUS ADJUSTMENT FOR A MATERIAL PROCESSING DEVICE, AND DEVICE FOR LASER MATERIAL PROCESSING

(71) Applicant: JENOPTIK Optical Systems GmbH, Jena (DE)

(72) Inventors: Jan Werschnik, Jena (DE); Stefan Franz, Jena (DE); Achmed Esselbach, Jena (DE)

(73) Assignee: Jenoptik Optical Solutions GmbH, Jena (DE)

( * ) Notice: Subject to any disclaimer, the term of this patent is extended or adjusted under 35 U.S.C. 154(b) by 758 days.

(21) Appl. No.: 17/274,695

(22) PCT Filed: Sep. 3, 2019

(86) PCT No.: PCT/EP2019/073428
§ 371 (c)(1),
(2) Date: Mar. 9, 2021

(87) PCT Pub. No.: WO2020/053031
PCT Pub. Date: Mar. 19, 2020

(65) Prior Publication Data
US 2021/0268602 A1    Sep. 2, 2021

(30) Foreign Application Priority Data

Sep. 10, 2018    (DE) ..................... 10 2018 007 212.7
Mar. 13, 2019    (DE) ..................... 10 2019 106 443.0

(51) Int. Cl.
*B23K 26/06*    (2014.01)
*B23K 26/046*    (2014.01)
(Continued)

(52) U.S. Cl.
CPC ........ *B23K 26/0648* (2013.01); *B23K 26/046* (2013.01); *G02B 7/08* (2013.01);
(Continued)

(58) Field of Classification Search
CPC .... B23K 26/0648; B23K 26/046; G02B 7/08; G02B 15/14; G02B 19/0014; G02B 19/0047; G02B 27/0955
See application file for complete search history.

(56) References Cited

U.S. PATENT DOCUMENTS 6,813,225 B2    11/2004    Widdowson et al.
9,557,518 B2    1/2017    Marth
(Continued)

FOREIGN PATENT DOCUMENTS

| DE | 102008048502 A1 | 4/2010 |
| DE | 102011121928 A1 | 2/2013 |
| DE | 102011117607 A1 | 5/2013 |

OTHER PUBLICATIONS

International Search Report dated Dec. 17, 2019 in corresponding application PCT/EP2019/073428.

*Primary Examiner* — Robert G Bachner
(74) *Attorney, Agent, or Firm* — Muncy, Geissler, Olds & Lowe, P.C.

(57) ABSTRACT

An apparatus (112) for focus adjustment for a device (100) for laser material processing, which has a movably arranged first lens unit (124), which comprises a first lens (108), and a movably arranged second lens unit (126), which comprises a second lens (110), has an adjustment device (114) which is designed to move the first lens unit (124) in a first direction (116) and to move the second lens unit (126) in a second direction (118) opposite to the first direction (116) in order to adjust a distance between the first lens (108) and the second lens (110) for the focus adjustment.

18 Claims, 8 Drawing Sheets

(51) Int. Cl.
*G02B 7/08* (2021.01)
*G02B 15/14* (2006.01)
*G02B 19/00* (2006.01)
*G02B 27/09* (2006.01)

(52) U.S. Cl.
CPC ......... *G02B 15/14* (2013.01); *G02B 19/0014* (2013.01); *G02B 19/0047* (2013.01); *G02B 27/0955* (2013.01)

(56) References Cited

U.S. PATENT DOCUMENTS

2010/0219247 A1* 9/2010 Nakata ............... G06K 7/10811
235/462.24
2012/0154936 A1* 6/2012 Park ....................... G02B 7/026
359/822

* cited by examiner

APPARATUS AND METHOD FOR FOCUS ADJUSTMENT FOR A MATERIAL PROCESSING DEVICE, AND DEVICE FOR LASER MATERIAL PROCESSING

This nonprovisional application is a National Stage of International Application No. PCT/EP2019/073428, which was filed on Sep. 3, 2019 and which claims priority to German Patent Application No. 10 2018 007 212.7, which was filed in Germany on Sep. 10, 2018, and German Patent Application No. 10 2019 106 443.0 which was filed in Germany on Mar. 13, 2019, which are all herein incorporated by reference.

BACKGROUND OF THE INVENTION

Field of the Invention

The present approach relates to an apparatus and to a method for adjusting the focus for a device for material processing and to a device for material processing, in particular for laser material processing.

In laser material processing, beam sizes and focus positions have to be adjusted very quickly. This adjustment is required either for the targeted setting of the focus position during 3D processing or to compensate for errors, e.g. in the case of uneven surfaces or fluctuations in the system.

Description of the Background Art

U.S. Pat. No. 6,813,225 B2 discloses a device for moving an optical element in an optomechanical system.

SUMMARY OF THE INVENTION

It is therefore an object of the present invention to provide Against this background, an apparatus and a method for focus adjustment for a device for material processing and a device for material processing according to the main claims are presented with the present approach. Advantageous refinements emerge from the respective subclaims and the following description.

The advantages that may be achieved with the approach presented are that a beam characteristic of a beam that may be used for material processing can be effected very quickly and without vibrations. The beam characteristic can relate, for example, to a beam size or beam focusing of the beam. In particular, this allows fast focus adjustment, for example in laser material processing.

An apparatus for the focus adjustment for a device for laser material processing having a movably arranged first lens unit, which comprises a first lens, and a movably arranged second lens unit, which comprises a second lens, has an adjustment device that is designed to move the first lens unit in a first direction and the second lens unit in a second direction opposite to the first direction in order to adjust a distance between the first lens and the second lens for the focus adjustment.

The device for laser material processing can have a laser, which is designed to emit a laser beam. The laser beam is in this case chosen as an example and can be replaced by another suitable beam. The laser beam can be guided through an optical unit, which can comprise at least the first and the second lens. The laser beam can be shaped by the optical unit. The laser beam exiting the device can be used to process a material onto which the laser beam is incident. The apparatus for focus adjustment can be embodied as a fixed part of the device or as an insert that can be integrated into the device. The distance between the lenses is adjusted by the movements of the first and second lenses that are controlled or carried out by the adjustment device. For this purpose, the adjustment device can comprise at least one actuator and/or an interface for providing control signals for controlling an actuator. The two lenses are arranged and shaped in such a way that the adjustment of the distance between the lenses changes the focus position of the laser beam. Accordingly, the beam size can also be changed by adjusting the distance. A lens unit can comprise only the corresponding lens or additionally one or more further elements. For example, in addition to the lens, a lens unit can comprise a lens holder and/or a movement element for moving the lens. The lens units can define the masses that are moved during the movement of the lenses.

According to one embodiment, focusing or magnification movements can be carried out with the aid of an actuator and the lenses. When the lenses move quickly, the change in the momentums of the lens units causes forces to act on an external system, for example a housing or a holder of an adjuster. Due to the opposing movements of the lens units, these changing forces can be prevented from causing vibrations in the device, which is also referred to as a machine, which can lead to poor results. It is also possible to dispense with a stable and thus complicated construction, which would otherwise be necessary to avoid vibrations. The opposing movements make possible the development of a compact, fast, low-vibration z-adjuster with a great optical effect.

The adjustment device can be designed to provide a first momentum transfer to the first lens unit in order to move the first lens in the first direction and to provide a second momentum transfer to the second lens unit in order to move the second lens in the second direction, wherein the first momentum transfer and the second momentum transfer are equal in terms of absolute value. The momentum transfers can take place, for example, between a carrier unit of the apparatus or the device and the lens units. The lens units can be accelerated relative to the carrier unit as a result of the momentum transfers. If the absolute values of the momentum transfers are the same but in opposite directions, interference effects occurring during the movement of the lenses can compensate one another.

The adjustment device can be designed to move the first lens unit by a first path distance and to move the second lens unit by a second path distance. In this case, the first path distance and the second path distance can be equal in terms of absolute value. This is expedient, for example, when the first lens unit and the second lens unit have the same mass. This can be the case if the first and the second lens are shaped identically.

Alternatively, the first path distance and the second path distance can have different absolute values. This is expedient, for example, when the first lens unit and the second lens unit have unequal masses. Due to the different path distances covered by the two lens units, momentum compensation can still take place.

In this case, the adjustment device can be designed to move the first lens unit during a first time period and to move the second lens unit during a second time period. The first time period and the second time period can start at the same point in time and be equal in terms of absolute value. If the first lens is moved only when the second lens is also moving, and vice versa, the interference effects caused by the movements can compensate one another.

The adjustment device can be designed to exert a first force on the first lens unit during the first time period and to exert a second force on the second lens unit during the second time period. In this case, the first force and the second force can act in opposite directions and be equal in terms of absolute value. This allows vibrations caused by the acting forces to compensate one another.

The apparatus can comprise a sensor device for capturing a first acceleration value, which represents an acceleration of the first lens unit, and additionally or alternatively for capturing a second acceleration value, which represents an acceleration of the second lens unit. The adjustment device can be designed to move the first lens unit and the second lens unit using the first acceleration value and the second acceleration value. For example, the adjustment device can be designed to move the lens units in such a way that the accelerations of the two lens units are opposite to one another and coordinated with one another.

The apparatus can comprise two first flexure hinges for movably supporting the first lens unit and two second flexure hinges for movably supporting the second lens unit. Each of the lens units can be arranged here between two flexure hinges, which in this way form a linear guide for the respective lens unit. In contrast to a guide having a rail and a carriage, the flexure hinges allow friction-free movement of the respective lens unit.

A corresponding device for material processing has the following features: a providing device for providing a beam; a movably arranged first lens unit, which comprises a first lens, and a movably arranged second lens unit, which comprises a second lens, wherein a beam path of the beam is guided through the first lens and the second lens; and an aforementioned apparatus for adjusting the focus of the device.

The beam can be a light beam or a particle beam, for example can be a laser beam. The providing device can thus be a suitable radiation source, such as a laser, for example. Thus, the aforementioned apparatus can advantageously be used in connection with a device for laser material processing. Depending on the application, a suitable type of laser can be used as the laser, such as a diode laser, a gas laser, or a solid-state laser.

A method for adjusting the focus for a device for laser material processing, which has a movably arranged first lens unit, which comprises a first lens, and a movably arranged second lens unit, which comprises a second lens, includes the following step: moving the first lens unit in a first direction and the second lens unit in a second direction opposite to the first direction in order to adjust a distance between the first lens and the second lens for the focus adjustment.

The step(s) of the method can be implemented or carried out using an embodiment of the aforementioned apparatus. The apparatus can be designed purely mechanically or electromechanically.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following description of advantageous exemplary embodiments of the present approach, the same or similar reference signs are used for the elements that are shown in the various figures and have a similar effect, with descriptions of these elements not being repeated.

Figure 1:
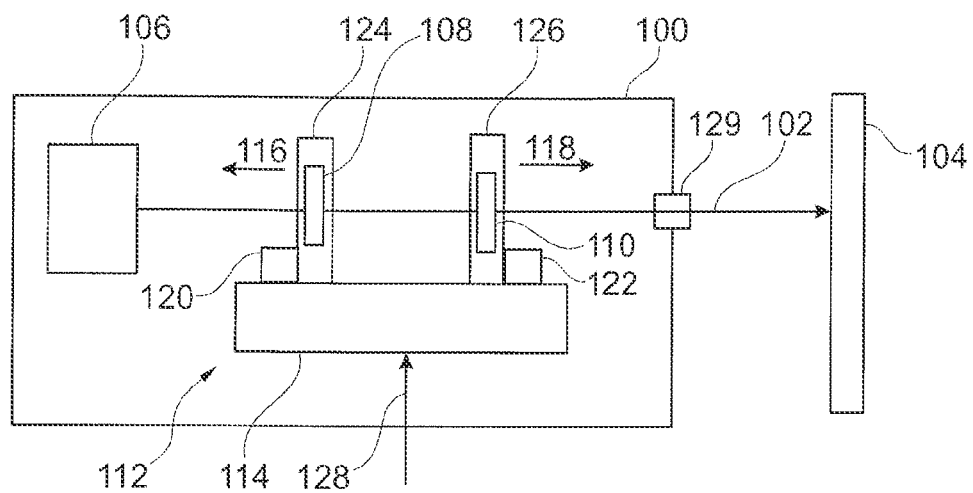
FIG. 1 shows a schematic illustration of a device for laser material processing according to an exemplary embodiment.

FIG. 1 shows a schematic illustration of a device 100 for laser material processing according to an exemplary embodiment. The device 100 is used to emit a laser beam 102. The laser beam 102 is directed, for example, onto a workpiece 104 that is processed using the laser beam 102. Instead of a laser beam, another type of beam can also be used.

The device 100 has, for example, a laser 106 as a providing device, which laser is designed to generate the laser beam 102. The beam path of the laser beam 102 is guided through an optical unit of the device 100, which optical unit comprises at least a first lens 108 and a second lens 110. For example, the focus of the laser beam 102 lies on a surface of the workpiece 104 facing the device 100. According to this exemplary embodiment, the focus is set by way of a distance between the lenses 108, 110. A position of the focus can be changed by changing the distance. Correspondingly, a beam diameter of the laser beam 102, for example at the level of the surface of the workpiece 104, can be changed by changing the distance.

The device 100 has an apparatus 112 for focus adjustment. The apparatus 112 is used to bring about the focus adjustment by adjusting the distance between the lenses 108, 110. According to different exemplary embodiments, the apparatus 112 is a fixed part of the device 100 or is embodied as an independent unit by which the device 100 can be supplemented. To adjust the distance between the lenses 108, 110, the apparatus 112 has an adjustment device 114. The adjustment device 114 is coupled to the lenses 108, 110 and is designed to move the lenses 108, 110 during an adjustment process for adjusting the focus of the laser beam 102 in mutually opposite directions 116, 118 in order to adjust the distance between the lenses 108, 110 and thus to adjust the focus of the laser beam 102. In this case, the lenses 108, 110, for example, perform opposing linear movements along a z-axis. For this purpose, for example, the first lens 108 is moved in a first direction 116 and the second lens 110 is moved into a second lens 118, as a result of which the distance between the lenses 108, 110 increases. According to one exemplary embodiment, the adjustment device 114 has at least one actuator, which is coupled to the lenses 108, 110 for moving the lenses 108, 110. The adjustment device 114 is designed, for example, to move the first lens 108 in accordance with a specified first time-distance profile in the first direction 116 and to move the second lens 110 in accordance with a specified second time-distance profile in the second direction 118.

To control the movements of the lenses 108, 110, the apparatus 112 has, for example, suitable mechanics or a suitable electrical controller. According to one exemplary embodiment, the apparatus 112 is designed to regulate the movements of the lenses 108, 110. For this purpose, the apparatus 112 has, for example, a sensor device, which is designed to capture the movements of the lenses 108, 110. By way of example, the sensor device has a first acceleration sensor 120 and a second acceleration sensor 122. The first acceleration sensor 120 is designed to capture an acceleration of the first lens 108 and to provide a first acceleration value corresponding to the acceleration. The second acceleration sensor 122 is designed to capture an acceleration of the second lens 110 and to provide a second acceleration value corresponding to the acceleration. In this case, the adjustment device 114 is designed, for example, to use the acceleration values in order to coordinate the movements of the lenses 108, 110 with one another.

According to this exemplary embodiment, the first lens 108 is received by a first holder. The first lens 108 and the first holder together form a first lens unit 124. In this case, when the first lens 108 is moved, it is not only the first lens 108 but the entire first lens unit 124 that moves. In addition or as an alternative to the first holder, the first lens unit 124 can comprise one or more other elements. When the first lens 108 is moved in the first direction 116, a corresponding first momentum is made up of the mass and the velocity of the first lens unit 124 in the first direction 116.

Correspondingly, according to this exemplary embodiment, the second lens 110 is received by a second holder. The second lens 110 and the second holder together form a second lens unit 126. In this case, when the second lens 110 is moved, it is not only the second lens 110 but the entire second lens unit 126 that moves. In addition or as an alternative to the second holder, the second lens unit 126 can comprise one or more other elements. When the second lens 110 moves in the second direction 118, a corresponding second momentum is made up of the mass and the velocity of the second lens unit 126 in the second direction 118.

If no holders or the like are provided for the lenses 108, 110, the lens units 124, 126 can be considered as synonymous with the lenses 108, 110.

According to one exemplary embodiment, the apparatus 112 is designed to effect the movements of the lens units 124, 126 during an adjustment process in such a way that resulting momentum changes are opposite to one another. For example, the adjustment device 114 is designed to provide a first momentum transfer to the first lens unit 124 during the adjustment process, through which the first lens unit 124 is moved in the first direction 116, and to provide a second momentum transfer to the second lens unit 126, through which the second lens unit 126 is moved in the second direction 118. The first momentum transfer and the second momentum transfer in this case are equal in terms of absolute value.

According to one exemplary embodiment, the apparatus 112 is designed to carry out the movements of the lens units 124, 126 simultaneously during an adjustment process. For this purpose, the first lens unit 124 is moved by a first path distance in the first direction 116 during a first time period and the second lens unit 126 is moved by a second path distance in the second direction 118 during a second time period. In this case, both time periods start at the same time and last the same length of time. In this way, lens units 124, 126 always move at the same time. Depending on the configuration of the lenses 108, 110 or the lens units 124, 126, the path distances traveled by the two lens units 124, 126 can be of the same length or of different lengths.

If the lens units 124, 126 have the same weight, the apparatus 112 is designed according to one exemplary embodiment to move the lens units 124, 126 by path distances of equal length during the adjustment process. If, on the other hand, the lens units 124, 126 have different weights, the apparatus 112 is designed according to one exemplary embodiment to move the lens units 124, 126 by path distances of different lengths during an adjustment process. In this way, the momentums of the lens units 124, 126 can be kept the same in terms of absolute value during the adjustment process despite the different weights.

According to one exemplary embodiment, the adjustment device 114 is designed to continuously exert a first force on the first lens unit 124 and a second force corresponding to the first force in terms of absolute value on the second lens unit 126 during the adjustment process. The magnitude of the forces in terms of absolute value can vary during the adjustment process.

According to an exemplary embodiment, the apparatus 112 has an input interface for receiving a focusing signal 128. The focusing signal 128 is provided, for example, by a user or a sensor system and indicates a required change in the focusing of the laser beam 102. According to one exemplary embodiment, the adjustment device 114 is designed to adjust the distance between the lenses 108, 110 using the focusing signal 128. For example, the focusing signal 128 can be used directly to control at least one actuator for moving the lens units 124, 126 of the adjustment device 114. If the adjustment device 114 has a control device and at least one actuator, the focusing signal 128 can be used to determine at least one control signal for controlling the at least one actuator. Such a control device is designed, for example, to determine the at least one control signal using a predetermined control rule and to provide it to the at least one actuator. A drive or a deformable adjustment element, for example, can be used as the actuator.

According to one exemplary embodiment, the lens units 124, 126 are part of a beam expander for enlarging or reducing a laser beam diameter. As a result, they allow various elements of an optical system to be adapted to one another. For example, the laser beam diameter at the output of the laser 106 can be adapted to a required diameter at the input of an objective 129. Such beam expanders are mainly used in laser material processing.

According to one exemplary embodiment, the apparatus 112 represents a compact, fast, low-vibration z-adjuster with a great optical effect. This is achieved by the apparatus 112 and an associated method, in which the focusing or magnification movements are carried out with the aid of an actuator with at least two lenses 108, 110.

The acceleration force acting on the first lens 108 is compensated for by the movement in the opposite direction of the second lens 110. The two lenses 108, 110 can be exactly the same. In this case, the lenses 108, 110 can have the same refractive power and the same mechanical design, for example with regard to geometry and material. In that case, they cancel out the external forces ideally with identical movements in opposite directions. The lenses 108, 110 can, however, also be different. In that case, according to an exemplary embodiment, acceleration symmetry is achieved in that the masses of the moving parts are compensated for, for example, via the mounts and/or guide components of the lens units 124, 126.

According to one exemplary embodiment, the driving forces acting when the lenses 108, 110 are moved are symmetrized by using different accelerations, i.e. the lighter component, that is to say for example the lighter one of the lens units 124, 126, travels a longer distance in the same time. For example, the adjustment device 114 has a suitable controller and drives for this purpose, wherein the controller of the drives makes a corresponding contribution, either calibrated as an open-loop controller or in closed-loop control with sensors 120, 122 for measuring acceleration. It is initially assumed that the travels of both lenses 108, 110 are equal. In the case of ideal symmetry, the following applies to the path distances s1 and s2 of the lenses 108, 110 traveled during the adjustment process: s2=−s1. Alternatively, the travels can be proportional to one another. In that case: s2=k*(−s1). If the travels are connected non-linearly, the following applies: s2=k*s1+l*s1²+m*s2³+ . . . . With a suitable controller, this case can also be solved by using suitable path-time profiles, wherein the following applies to the driving force acting on the lens units 124, 126: F1=−F2.

Owing to the axis with the corresponding optical setup, the speed of the adjustment of the focus is doubled compared to only one movable lens. The resulting force is canceled out by the opposing forces. The opposing component, for example the second lens unit 126, contributes to increasing the optical effect of the arrangement. The machine, that is to say the apparatus 112 or the device 100, or a subsequent optical unit do not require any special construction or damping measures. Additionally or alternatively, an inertia damper, a counter-mass, or a vibration damper can be used in order to reduce interference effects caused by the movements of the lenses 108, 110. Such measures, which are less precise and lead to less good results than the movement of the lenses 108, 110 in opposite directions, can, however, help.

Typical applications for the device 100 are drilling, cutting, welding, deep laser engraving, rapid prototyping, rapid tooling, microstructuring, and 3D workpiece processing.

Figure 2:
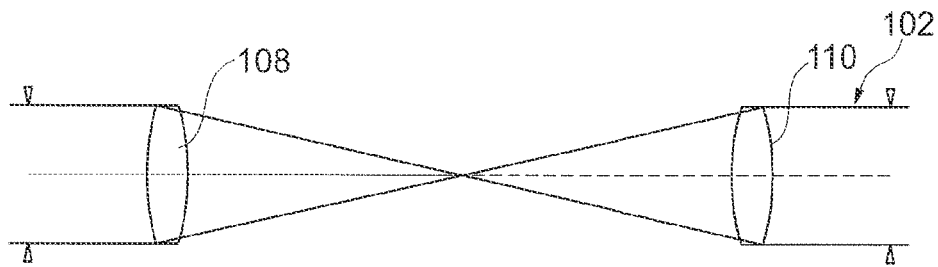
FIG. 2 shows two lenses for a device for laser material processing according to an exemplary embodiment.

FIG. 2 shows two lenses 108, 110 for a device for laser material processing according to an exemplary embodiment. This can be an exemplary embodiment of the lenses described with reference to FIG. 1. A beam path of the laser beam 102 through the lenses 108, 110 is shown. The optical principle shown is symmetrical with two lenses 108, 110. For this purpose, the lenses 108, 110 are embodied identically according to one exemplary embodiment. In this case, the lenses 108, 110 can be moved during an adjustment process in such a way that they simultaneously travel path distances having the same absolute value but in opposite directions.

Figure 3:
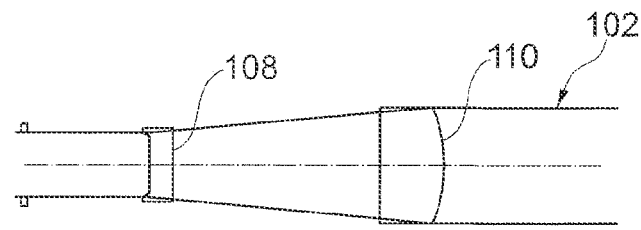
FIG. 3 shows two lenses for a device for laser material processing according to an exemplary embodiment.

FIG. 3 shows two lenses 108, 110 for a device for laser material processing according to an exemplary embodiment. This can be an exemplary embodiment of the lenses described with reference to FIG. 1. A beam path of the laser beam 102 through the lenses 108, 110 is shown. The optical principle shown is asymmetrical with two lenses 108, 110. For this purpose, the lenses 108, 110 are embodied differently according to one exemplary embodiment. In particular if the lenses 108, 110 have different masses, the lenses 108, 110 can be moved during an adjustment process in such a way that they simultaneously travel path distances that are different in terms of absolute value and extend in opposite directions.

Figure 4:
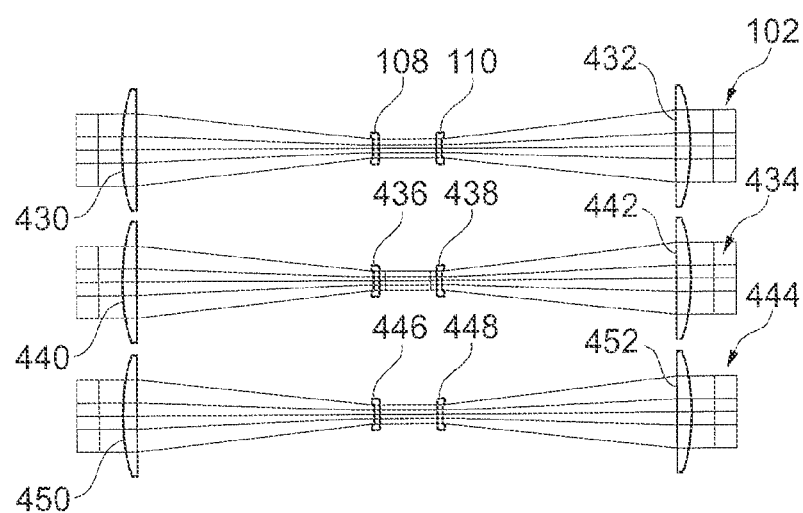
FIG. 4 shows a lens arrangement for a device for laser material processing according to an exemplary embodiment.

FIG. 4 shows a lens arrangement for a device for laser material processing according to an exemplary embodiment. This can be an exemplary embodiment of the device described with reference to FIG. 1. A beam path of the laser beam 102 through the lenses 108, 110 is shown. The lenses 108, 110 are arranged in this case between two further lenses 430, 432. The laser beam 102 has a first beam characteristic, for example a blue color. The optical principle shown is symmetrical with four lenses 108, 110, 430, 432. The outer lenses 430, 432 can be movable together with the lenses 108, 110 or fixed.

Optionally, the lens arrangement for a second laser beam 434 having a second beam characteristic, for example a green color, has further lenses 436, 438, 440, 442, which can be embodied corresponding to the lenses 108, 110, 430, 432.

Optionally, the lens arrangement for a third laser beam 444, which has a third beam characteristic, for example a red color, has further lenses 446, 448, 450, 452, which can be embodied corresponding to the lenses 108, 110, 430, 432.

According to one exemplary embodiment, the three lens arrangements shown symbolize different beam paths. The lens arrangement shown in connection with the first laser beam 102 shows an initial position of the lenses 108, 110, which is also referred to as the "0" position. The lens arrangement shown in connection with the second laser beam 434 shows a deflection which leads to a shift of the focusing in the positive direction along the z-axis. The lens arrangement shown in connection with the third laser beam 444 shows a shift in the negative direction. According to this exemplary embodiment, the device only leads to a collimated, convergent and divergent beam—this leads to a focus shift by way of a further lens (not shown in FIG. 4).

This effect is achieved by the small lenses 108, 110, 436, 438, 446, 448. According to this exemplary embodiment, a distance between the lenses 436, 438 is greater than a distance between the lenses 108, 110, and a distance between the lenses 446, 448 is smaller than a distance between the lenses 108, 110.

To achieve this effect, the curvatures of the lenses 436, 438, 446, 448 are slightly changed according to an alternative exemplary embodiment compared to the curvatures of the lenses 108, 110 in order to compensate for the wavelength.

Figure 5:
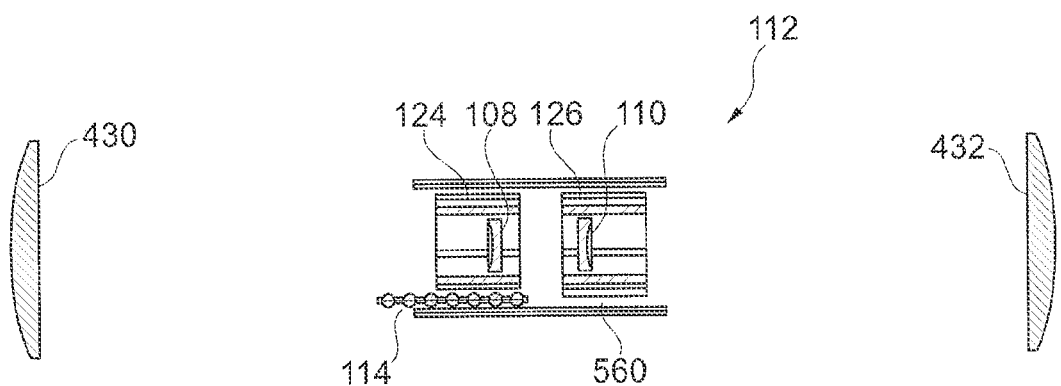
FIG. 5 shows an apparatus for focus adjustment for a device for laser material processing according to an exemplary embodiment.

FIG. 5 shows an apparatus 112 for adjusting the focus for a device for laser material processing according to an exemplary embodiment. This can be an exemplary embodiment of the device described with reference to FIG. 1, which has a fully symmetrical optical system with two movable lenses 108, 110 and two fixed lenses 430, 432. The lenses 108, 110, 430, 432 can be used, for example, to shape the laser beam shown in FIG. 1.

According to an exemplary embodiment, the lenses 108, 110 are arranged in two movable lens units 124, 126. The apparatus 112 has an adjustment device 114 which is used to move the lens units 124, 126 guided within a housing 560.

Figure 6:
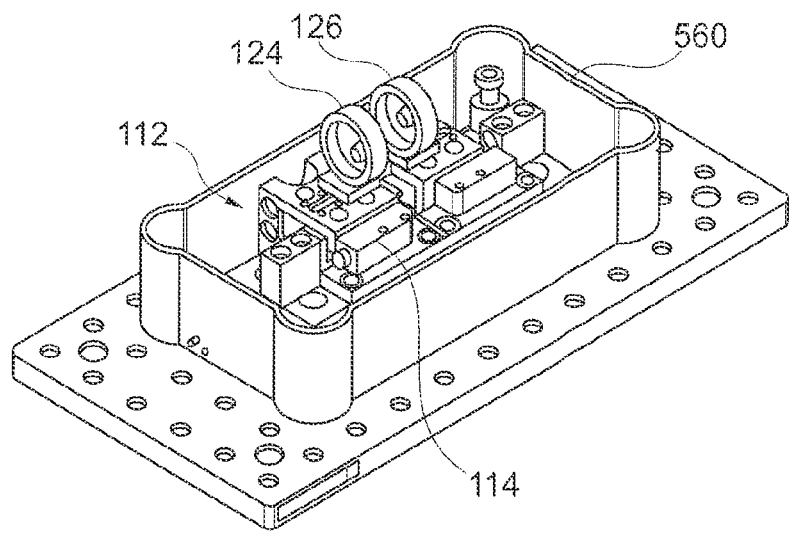
FIG. 6 shows an apparatus for focus adjustment according to an exemplary embodiment.

FIG. 6 shows an apparatus 112 for adjusting the focus according to an exemplary embodiment. The apparatus 112 is arranged in a housing 560 arranged on a base plate. For moving two lens units 125, 126, the apparatus 112 has an adjustment device 114, as is described with reference to the preceding figures. The apparatus 112 is implemented here as a beam expander (BEX).

Figure 7:
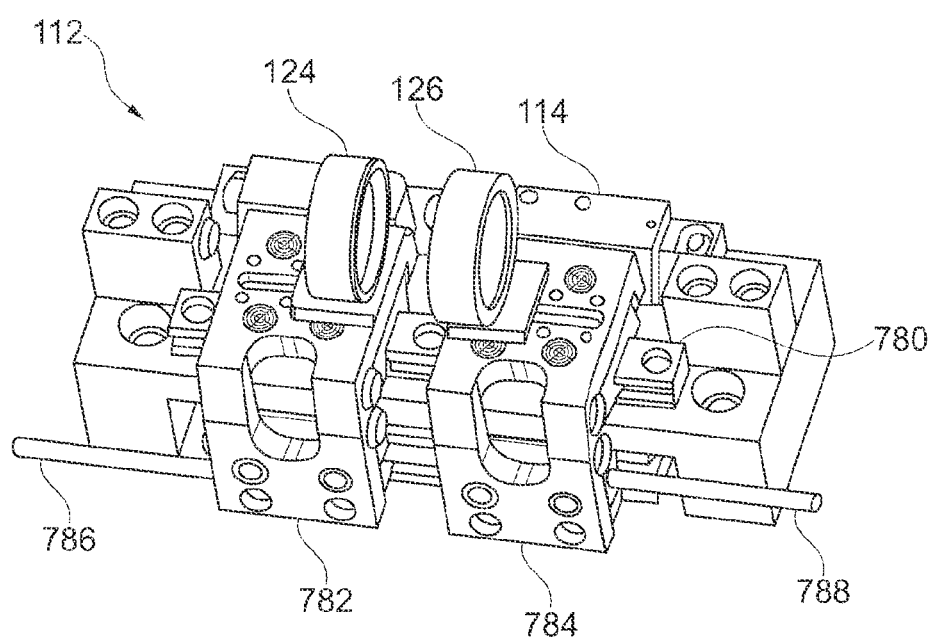
FIG. 7 shows an apparatus for focus adjustment according to an exemplary embodiment.

FIG. 7 shows an apparatus 112 for adjusting the focus according to an exemplary embodiment. This is a detailed view of the apparatus described with reference to FIG. 6. The two lens units 124, 126 and an adjustment device 114 are shown. The adjustment device 114 comprises a linear guide 780 with a first carriage 782 and a second carriage 784. The first lens unit 124 is mounted on the first carriage 782 and the second lens unit 126 is mounted on the second carriage 784.

One linear drive and one path measurement system are present for each carriage 782, 784. Of a first linear drive for moving the first carriage 782, only a first shaft 786 is shown in FIG. 7, and of a second linear drive for moving the second carriage 784, only a second shaft 788 is shown in FIG. 7.

According to one exemplary embodiment, a rotation motor having stator windings and a rotor embodied as a permanent magnet is used as the drive. The drive provides speed and acceleration.

According to one exemplary embodiment, a guide that ensures a straight and precise procedure and is wear-free is used as the linear guide 780. The linear guide 780 can in this case have a rail over which the carriages 782, 784 are guided. Alternatively, a linear guide by means of a flexure hinge can be used.

Figure 8:
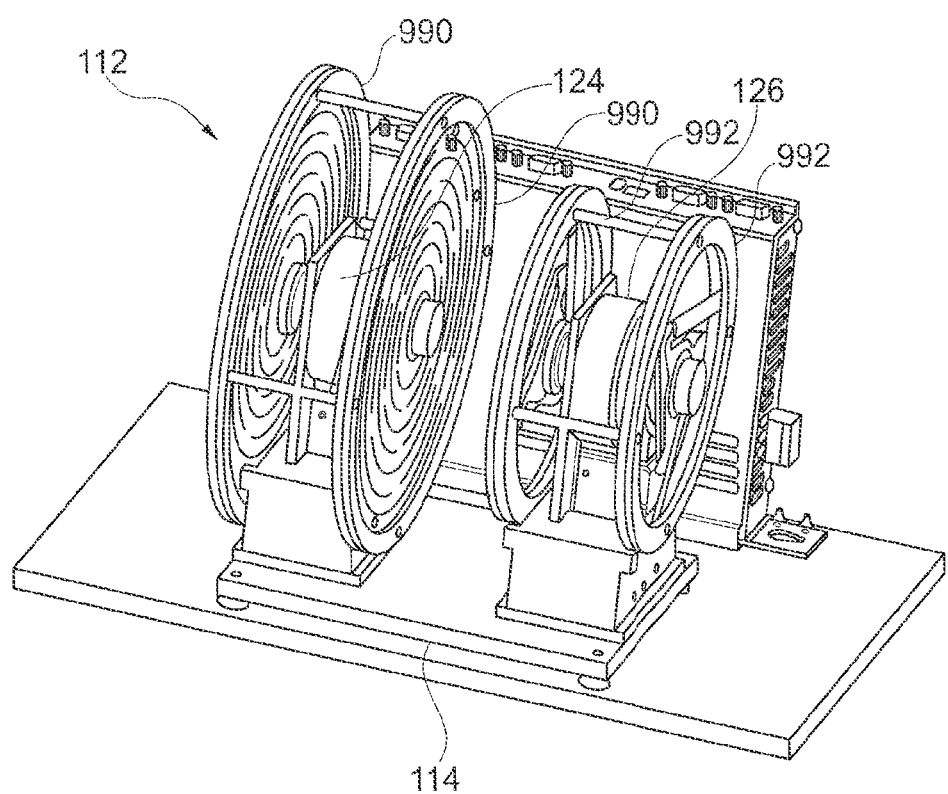
FIG. 8 shows an apparatus for focus adjustment according to an exemplary embodiment.

FIG. 8 shows an apparatus 112 for adjusting the focus according to an exemplary embodiment. This can be an exemplary embodiment of the apparatus described with reference to FIG. 1. Two lens units 124, 126 and an adjustment device 114 are shown. Linear movements of the lens units 124, 126 are made possible using first flexure hinges 990 and second flexure hinges 992.

Two first flexure hinges 990 are embodied to be disk-shaped and arranged parallel to one another, wherein the first lens unit 124 is arranged between the two flexure hinges 990 and held by the flexure hinges 990.

Two second flexure hinges 992 are embodied to be disk-shaped and arranged parallel to one another, wherein the second lens unit 126 is arranged between the two flexure hinges 992 and held by the flexure hinges 990.

Depending on the point of view, the flexure hinges 990, 992 can be regarded as a constituent part of the lens units 124, 126, as a constituent part of the adjustment device 114, or partially as a constituent part of the lens units 124, 126 and partially as a constituent part of the adjustment device 114. For example, mounts of the flexure hinges 990, 992 used to hold a lens can be regarded as constituent parts of the lens units 124, 126 and fastening rings for attaching the flexure hinges 990, 992 to a housing or carrier element can be regarded as constituent parts of the adjustment device 114.

According to the exemplary embodiment shown, the first flexure hinges 990 differ from the second flexure hinges 992. During an adjustment process, for example the first flexure hinges 990 allow a movement of the first lens unit 124 by a first path distance and the second flexure hinges 992 allow a movement of the second lens unit 126 by a second path distance that differs from the first path distance.

Figure 9:
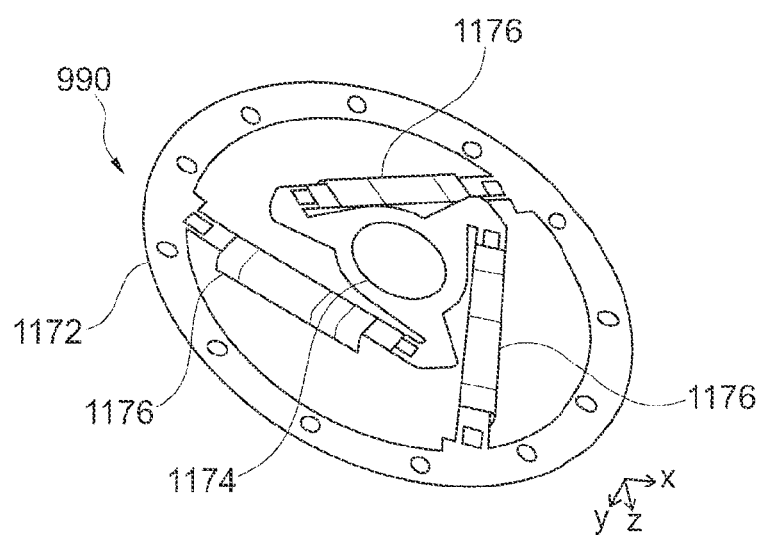
FIG. 9 shows an element for solid-body guidance according to an exemplary embodiment.

FIG. 9 shows a flexure hinge 990 for solid-body guidance according to an exemplary embodiment. The flexure hinge 990 has a fastening ring 1172, a mount 1174 and guide components 1176. A lens can be received by the mount 1174 as a solid body, for example the first lens 108 shown with reference to FIG. 1. The guide components are shaped to couple the mount 1174 to the fastening ring 1172. The mount 1174 and optionally the guide components 1176 can thus be understood to be parts of a lens unit, as is described with reference to FIG. 1.

The guide components 1176 are embodied as three deformable bars. When the bars are deformed, for example using an adjustment device as described with reference to FIG. 1, the mount 1174 executes a linear movement along a central axis of the flexure hinge 990. For example, by deforming the flexure hinge 990, a movement of the mount 1174 by a maximum of 4 mm can be realized. A diameter of the flexure hinge 990 is approximately 15 centimeters, for example.

When the flexure hinge 990 is not deformed, the fastening ring 1172 and the mount 1174 lie in one plane. In the maximum overall deformation shown in FIG. 11, the fastening ring 1172 and the mount 1174 lie in spaced parallel planes.

Figure 10:
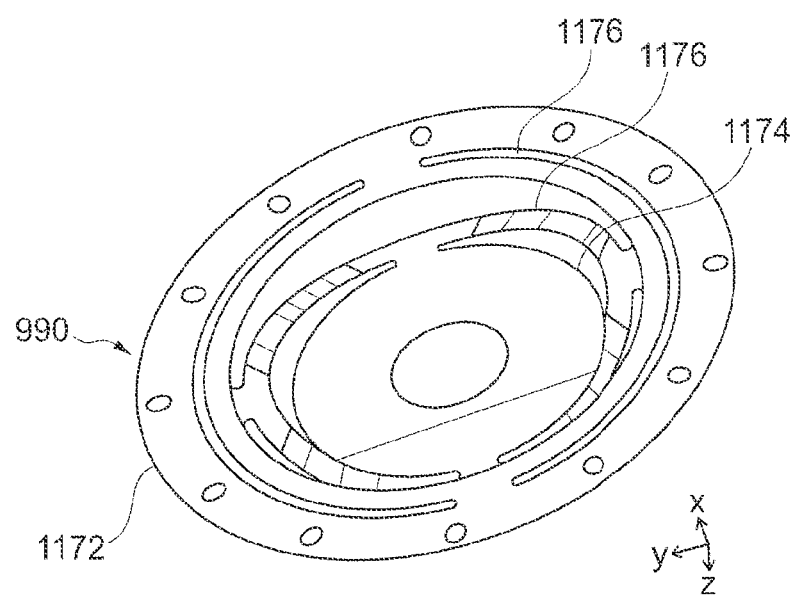
FIG. 10 shows an element for solid-body guidance according to an exemplary embodiment.

FIG. 10 shows a flexure hinge 990 for solid-body guidance according to an exemplary embodiment. The flexure hinge 990 has a fastening ring 1172, a mount 1174 and guide components 1176 in a manner corresponding to the exemplary embodiment described with reference to FIG. 9. In contrast to FIG. 9, the guide components 1176 are shaped as an outer ring and an inner ring, which are arranged between the annular fastening ring 1172 and the annular mount 1174. The outer ring of the guide component 1176 is connected to the fastening ring 1172 via two opposing bars and to the inner ring via two further bars. The inner ring of the guide component 1176 is connected to the mount 1174 via two opposing bars.

Figure 11:
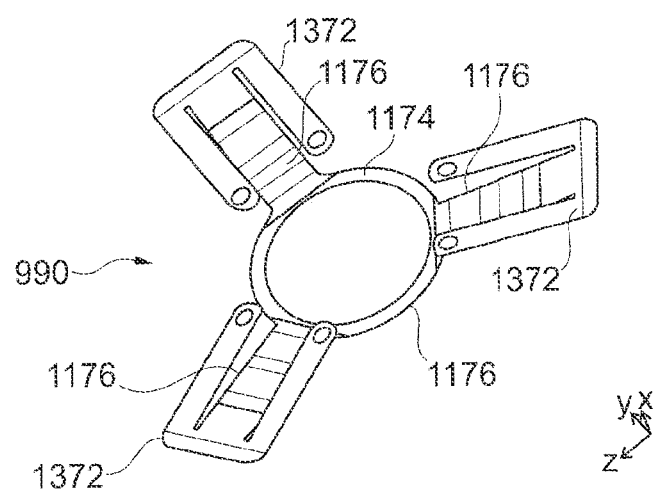
FIG. 11 shows an element for solid-body guidance according to an exemplary embodiment.

FIG. 11 shows a flexure hinge 990 for solid-body guidance according to an exemplary embodiment. The flexure hinge 990 has a mount 1174 and guide components 1176 in accordance with the exemplary embodiment described with reference to FIG. 9. In contrast to FIG. 9, three fastening elements 1372 are provided instead of the fastening ring. Each of the fastening elements 1372 is connected to the mount 1174 via a guide component 1176 formed as a straight bar.

Figure 12:
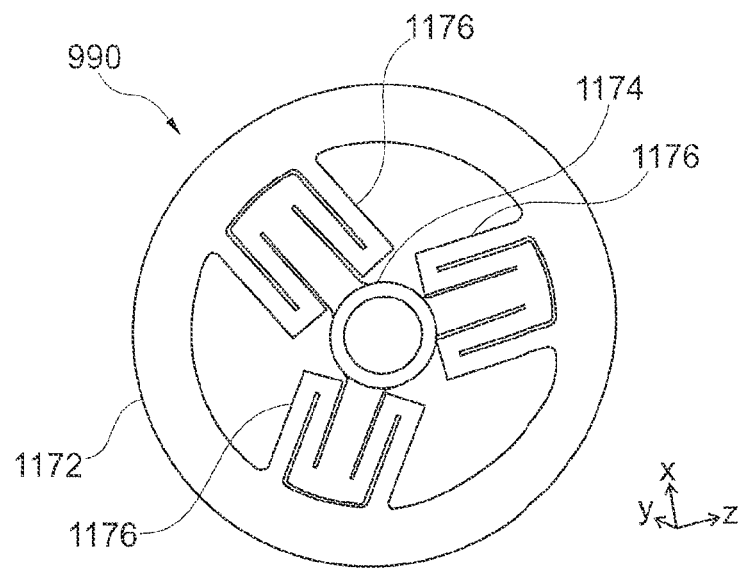
FIG. 12 shows an element for solid-body guidance according to an exemplary embodiment.

FIG. 12 shows a flexure hinge 990 for solid-body guidance according to an exemplary embodiment. The flexure hinge 990 has a fastening ring 1172, a mount 1174, and guide components 1176 in a manner corresponding to the exemplary embodiment described with reference to FIG. 9. In contrast to FIG. 9, the guide components 1176 are not shaped as straight bars but rather as meandering bars.

Figure 13:
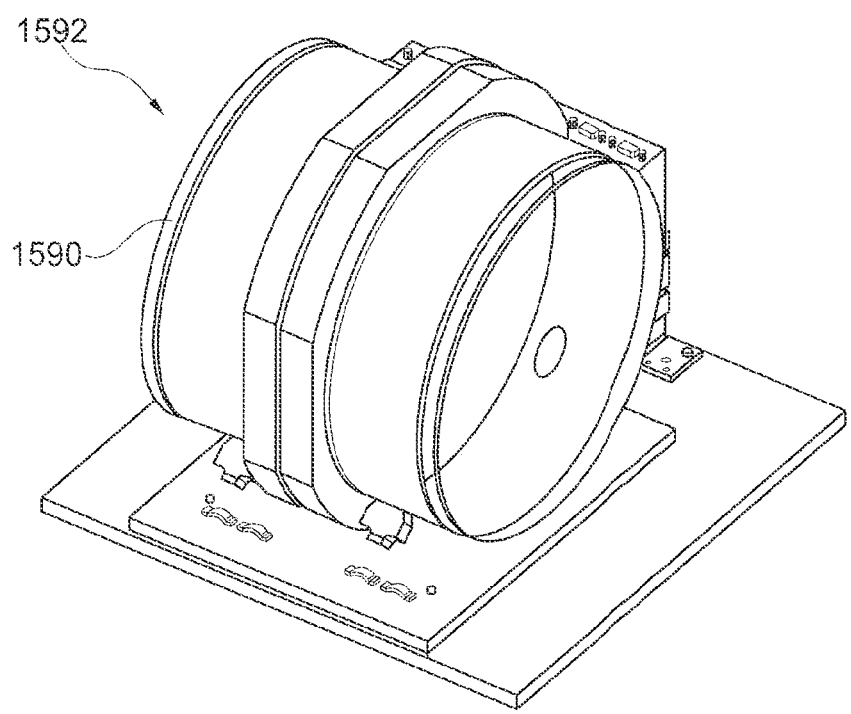
FIG. 13 shows an external view of a housing for a linear guide by means of a flexure hinge according to an exemplary embodiment.

FIG. 13 shows an external view of a housing 1590 for a linear guide 1592 by means of a flexure hinge according to an exemplary embodiment.

Figure 14:
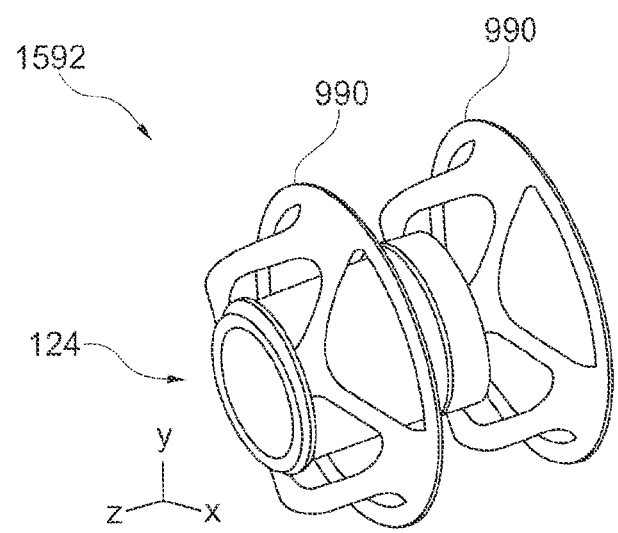
FIG. 14 shows a linear guide by means of a flexure hinge according to an exemplary embodiment.

FIG. 14 shows a linear guide 1592 by means of a flexure hinge according to an exemplary embodiment. The linear guide 1592 can be used to make possible linear movement of a lens unit 124. This can be the first lens unit described in FIG. 1. A corresponding further linear guide can be used for the second lens unit shown in FIG. 1.

According to this exemplary embodiment, two flexure hinges 990 arranged in parallel are used for the linear guide 1592, as are described with reference to the preceding figures.

Figure 15:
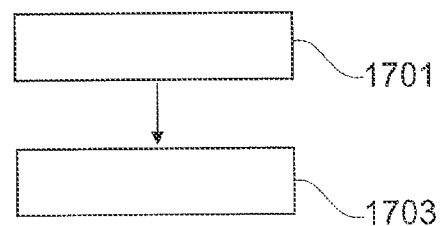
FIG. 15 shows a flowchart of a method for laser material processing according to an exemplary embodiment.

FIG. 15 shows a flowchart of a method for laser material processing according to an exemplary embodiment. The method can be carried out in connection with an apparatus for focus adjustment, as is described with reference to the preceding figures.

In a step 1701, a laser beam is provided, which is guided at least through a first lens and a second lens. A focus of the laser beam is set by way of a distance between the lenses. In a step 1703, the first lens is moved in a first direction and the second lens is moved in a second direction opposite to the first direction in order to adjust the distance between the first lens and the second lens for the focus adjustment. Step 1703 can also be carried out before step 1701. Step 1703 can be carried out repeatedly in order to refocus the laser beam.

If an exemplary embodiment comprises an "and/or" conjunction between a first feature and a second feature, this should be read to mean that the exemplary embodiment, according to one embodiment, has both the first feature and the second feature, and, according to a further embodiment, has either only the first feature or only the second feature.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for focus adjustment for a device for laser material processing, which has a movably arranged first lens unit, which comprises a first lens and a movably arranged second lens unit, which comprises a second lens, the apparatus comprising:
an adjustment device, which is designed to move the first lens unit in a first direction and to move the second lens unit in a second direction opposite to the first direction in order to adjust a distance between the first lens and the second lens for the focus adjustment,
wherein the adjustment device is designed to provide a first momentum transfer to the first lens unit in order to move the first lens in the first direction and to provide a second momentum transfer to the second lens unit in order to move the second lens in the second direction, and
wherein the first momentum transfer and the second momentum transfer are equal in terms of absolute value.

2. The apparatus as claimed in claim 1, wherein the adjustment device is designed to move the first lens unit by a first path distance and to move the second lens unit by a second path distance, wherein the first path distance and the second path distance are equal in terms of absolute value.

3. The apparatus as claimed in claim 1, wherein the adjustment device is designed to move the first lens unit by a first path distance and to move the second lens unit by a second path distance, wherein the first path distance and the second path distance are different in terms of absolute value.

4. The apparatus as claimed in claim 1, wherein the adjustment device is designed to move the first lens unit during a first time period and to move the second lens unit during a second time period, wherein the first time period and the second time period start at the same point in time and are the same in terms of absolute value.

5. The apparatus as claimed in claim 4, wherein the adjustment device is designed to exert a first force on the first lens unit during the first time period and to exert a second force on the second lens unit during the second time period, wherein the first force and the second force are directed opposite to each other and are equal in terms of absolute value.

6. The apparatus as claimed in claim 1, further comprising a sensor device for capturing a first acceleration value, which represents an acceleration of the first lens unit, and for capturing a second acceleration value, which represents an acceleration of the second lens unit, wherein the adjustment device is designed to move the first lens unit and the second lens unit using the first acceleration value and the second acceleration value.

7. The apparatus as claimed in claim 1, further comprising two first flexure hinges for movably supporting the first lens unit and two second flexure hinges for movably supporting the second lens unit.

8. A device for material processing, the device comprising:
a providing device, in particular a laser, for providing a beam;
a movably arranged first lens unit, which comprises a first lens, and a movably arranged second lens unit, which comprises a second lens, wherein a beam path of the beam is guided through the first lens and the second lens; and
an apparatus as claimed in claim 1 for adjusting the focus of the device.

9. A method for focus adjustment for a device for material processing, which has a movably arranged first lens unit, which comprises a first lens, and a movably arranged second lens unit, which comprises a second lens, the method comprising:
moving the first lens unit in a first direction; and
moving the second lens unit in a second direction opposite to the first direction in order to adjust a distance between the first lens and the second lens for the focus adjustment,
wherein a first momentum transfer is provided to the first lens unit in order to move the first lens in the first direction and a second momentum transfer is provided to the second lens unit in order to move the second lens in the second direction, and
wherein the first momentum transfer and the second momentum transfer are equal in terms of absolute value.

10. The apparatus as claimed in claim 6, wherein the sensor device comprises:
a first acceleration sensor for capturing the acceleration of the first lens unit; and
a second acceleration sensor for capturing the acceleration of the second lens unit.

11. The apparatus as claimed in claim 1, wherein the first lens unit comprises the first lens and a first lens holder and the second lens unit comprises the second lens and a second lens holder, and
wherein the first momentum transfer is made up of a mass and a velocity of the entire first lens unit and the second momentum transfer is made up of a mass and a velocity of the entire second lens unit.

12. The apparatus as claimed in claim 1, wherein the apparatus is configured to carry out movements of the first lens unit and the second lens unit simultaneously.

13. The apparatus as claimed in claim 1, wherein when the first lens unit and the second lens unit have a same weight, the apparatus is configured to move the first lens unit and the second lens unit by a path distance of a same length, and wherein when the first lens unit and the second lens unit have a different weight, the apparatus is configured to move the first lens unit and the second lens unit by a path distance of a different length.

14. The apparatus as claimed in claim 1, further comprising an input interface configured to receive a focusing signal, the focusing signal indicating a required change in the focusing of a laser beam of the device.

15. The apparatus as claimed in claim 14, wherein the focusing signal is used to control an actuator for moving the first lens unit and the second lens unit.

16. The apparatus as claimed in claim 1, wherein the adjustment device comprises:
 a linear guide;
 a first carriage on the linear guide, the first carriage configured to support the first lens unit; and
 a second carriage on the linear guide, the second carriage configured to support the second lens unit.

17. The apparatus according to claim 7, wherein the two first flexure hinges are embodied as disk-shaped members and are arranged parallel to each other, and wherein the first lens unit is arranged between the two first flexure hinges.

18. The apparatus according to claim 17, wherein the two second flexure hinges are embodied as disk-shaped members and are arranged parallel to each other, and wherein the second lens unit is arranged between the two second flexure hinges.

\* \* \* \* \*